(12) United States Patent
Hewson

(10) Patent No.: US 10,454,875 B2
(45) Date of Patent: Oct. 22, 2019

(54) CONTENT ENHANCEMENT SERVICES

(71) Applicant: Speakable PBC, New York, NY (US)

(72) Inventor: Jordan Hewson, Brooklyn, NY (US)

(73) Assignee: Speakable PBC, New York, NY (US)

( * ) Notice: Subject to any disclaimer, the term of this patent is extended or adjusted under 35 U.S.C. 154(b) by 572 days.

(21) Appl. No.: 15/000,000

(22) Filed: Jan. 18, 2016

(65) Prior Publication Data

US 2017/0205991 A1 Jul. 20, 2017

(51) Int. Cl.
*G06F 3/048* (2013.01)
*H04L 12/58* (2006.01)
*G06Q 30/02* (2012.01)
*G06F 16/00* (2019.01)
*G06F 16/31* (2019.01)

(52) U.S. Cl.
CPC ............. *H04L 51/32* (2013.01); *G06F 16/00* (2019.01); *G06F 16/313* (2019.01); *G06Q 30/0279* (2013.01)

(58) Field of Classification Search
CPC .. G06F 3/04842; G06F 3/0482; G06F 16/313; G06F 16/00; G06Q 50/00; G06Q 30/0279; H04L 51/32
See application file for complete search history.

(56) References Cited

U.S. PATENT DOCUMENTS

| | | | |
|---|---|---|---|
| 9,582,482 B1 * | 2/2017 | Sharifi | |
| 9,846,751 B2 | 12/2017 | Frenkel et al. | |
| 2010/0180187 A1 | 7/2010 | Miller et al. | |
| 2013/0091463 A1 * | 4/2013 | Nordstrom | G06F 17/30905 715/810 |
| 2013/0232030 A1 * | 9/2013 | Gockeler | H04L 67/22 705/26.8 |
| 2013/0253993 A1 | 9/2013 | Brower | |

(Continued)

FOREIGN PATENT DOCUMENTS

| WO | 2012/057791 A1 | 5/2012 |
|---|---|---|
| WO | 2014/009728 A1 | 1/2014 |

OTHER PUBLICATIONS

ActOn by Social Inertia, Inc., iTunes Preview, Dec. 8, 2015, 3 pages, https://itunes.apple.com/us/app/acton/d604178225?mt=8.

(Continued)

*Primary Examiner* — Andrew T Chiusano
(74) *Attorney, Agent, or Firm* — Wolf, Greenfield & Sacks, P.C.

(57) ABSTRACT

Systems, methods, and computer-readable media for a content enhancement service are provided. In one embodiment, a method may include identifying at least one key term associated with an item of content provided by a content provider subsystem, generating an issue interface including an issue action element that is associated with the at least one identified key term, and incorporating the issue interface into an online presentation that includes the item of content, where the incorporated issue interface enables selection of the issue action element by a user consuming the item of content via the online presentation while the online presentation is presented to the user, and where selection of the issue action element is operative to automatically carry out an action that is associated with the at least one identified key term while the online presentation is presented to the user.

23 Claims, 4 Drawing Sheets

(56) References Cited

U.S. PATENT DOCUMENTS

| | | | |
|---|---|---|---|
| 2013/0290203 A1* | 10/2013 | Purves | G06Q 50/01 |
| | | | 705/319 |
| 2014/0258014 A1 | 9/2014 | Collins et al. | |
| 2015/0127640 A1* | 5/2015 | Nordstrom | G06F 17/3053 |
| | | | 707/723 |
| 2015/0348070 A1 | 12/2015 | Boettcher | |
| 2016/0196589 A1* | 7/2016 | Subbarayan | G06Q 30/0279 |
| | | | 705/319 |
| 2017/0034581 A1* | 2/2017 | Short | H04N 21/4126 |
| 2017/0213243 A1* | 7/2017 | Dollard | G06Q 30/0249 |
| 2018/0158114 A1* | 6/2018 | Twist | G06Q 30/0279 |

OTHER PUBLICATIONS

International Search Report and Written Opinion dated Mar. 17, 2017 in connection with International Application No. PCT/US2016/068040.

International Preliminary Report on Patentability dated Aug. 2, 2018 in connection with International Application No. PCT/US2016/068040.

Hewson, "Turning the News Into Action With the Action Button." Mar. 24, 2015, 3 pages, https://www.huffingtonpost.com/jordan-hewson/turning-the-news-into-act_b_6524508.html.

\* cited by examiner

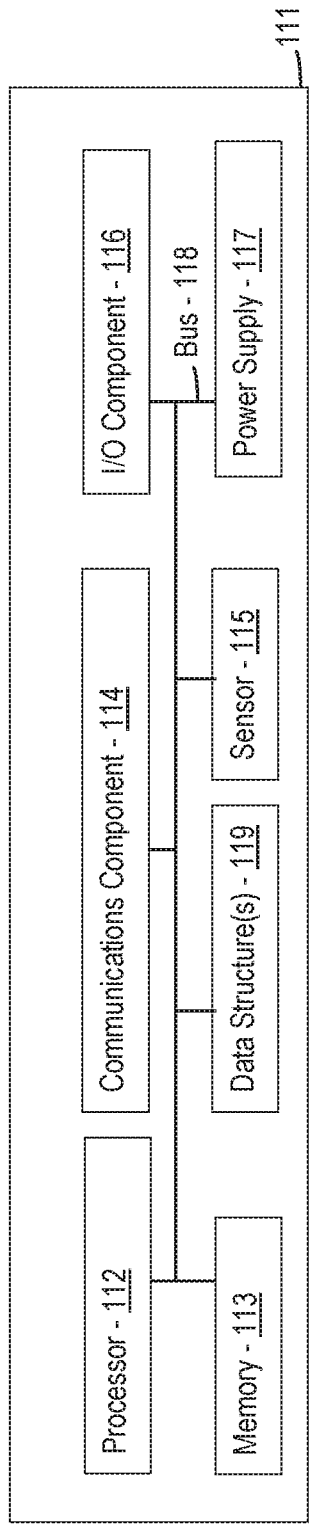

<Online Resource of Content Provider Subsystem> — 352

Item(s) of Content — 354

354a {
*This morning, a report released by "MNO" indicates that the poverty level in the country of "PQR" has risen to an historic high.
*Comments made this morning by President "STU" of "PQR" indicate that he intends to consider a new bill "VWX" that will provide immediate relief to the poor of his country.
*However, even that bill will only do so much, as non-profit organization "YZA" estimates at least $5,000,000 of additional relief will be needed to stem the tide.

354b — <Play A/V Content>

Issue Interface — 356

<Issue Interface Brand> — 355     <Code> — 357

358 {
Issue Action Element — 358a
Select This Issue Action Element to Send The Below Editable Message Using Action Target Subsystem "BCD"
By Pressing this <Button> — 359a   (after entering your credentials here: <Action Target ID> & <Action Target Password>)   <Action Data> — 361a "@PresidentSTU, please pass bill VWX to save the poor of PQR – see more at www.CPsubsystem.com/content354"

Issue Action Element — 358b
Select This Issue Action Element to Donate The Following Amount $<###> To "YZA" Using Action Target Subsystem "EFG"
By Pressing this <Button> — 359b   (after entering your credentials here: <Action Target ID> & <Action Target Password>)   <Action Data> — 361b Issue Action Element — 358c
Select This Issue Action Element to Donate The Following Time <###> To "HIJ" Using Action Target Subsystem "KLM"
By Pressing this <Button> — 359c   (after entering your credentials here: <Action Target ID> & <Action Target Password>)   <Action Data> — 361c Advertisement Content — 360

Links to Other Items of Content — 362

CONTENT ENHANCEMENT SERVICES

TECHNICAL FIELD

This disclosure relates to content enhancement services.

BACKGROUND OF THE DISCLOSURE

Conventional content publishers have several disadvantages including, but not limited to, the inability to enable content consumers to engage with published content in an effective and/or efficient manner for bringing about meaningful impact.

SUMMARY OF THE DISCLOSURE

This document describes systems, methods, and computer-readable media for a content enhancement service.

As just one example, a method of enabling a user of a content engager subsystem to interact with media using a content enhancement service subsystem, a content provider subsystem, and an action target subsystem may be provided that may include identifying, with the content enhancement service subsystem, at least one key term associated with an item of content provided by the content provider subsystem, generating, with the content enhancement service subsystem, an issue interface including an issue action element that is associated with the at least one identified key term, and incorporating the issue interface into an online presentation of the content provider subsystem that includes the item of content, where the incorporated issue interface enables selection of the issue action element by the user using the content engager subsystem while the online presentation is presented to the user by the content engager subsystem, and where selection of the issue action element is operative to automatically carry out, with the action target subsystem, an action that is associated with the at least one identified key term while the online presentation is presented to the user by the content engager subsystem.

As another example, a non-transitory computer-readable storage medium storing at least one program may be provided, the at least one program including instructions, which, when executed by at least one processor of a content enhancement service subsystem, cause the at least one processor to identify at least one key term associated with an item of content provided by a content provider subsystem, generate an issue interface including an issue action element that is associated with the at least one identified key term, and incorporate the issue interface into an online presentation that includes the item of content, where the incorporated issue interface enables selection of the issue action element by a user using a content engager subsystem while the online presentation is presented to the user by the content engager subsystem, and where selection of the issue action element is operative to automatically carry out an action that is associated with the at least one identified key term while the online presentation is presented to the user by the content engager subsystem.

As yet another example, a content enhancement service subsystem in a system including a content provider subsystem, a content engager subsystem, and an action target subsystem may be provided that may include an online communications component and a processor that identifies at least one key term associated with an item of content provided by the content provider subsystem, generates an issue interface including an issue action element that is associated with the at least one identified key term, and incorporates, via the online communications component, the issue interface into an online presentation that includes the item of content, where the incorporated issue interface enables selection of the issue action element by a user using the content engager subsystem while the online presentation is presented to the user by the content engager subsystem, and where selection of the issue action element is operative to automatically carry out, with the action target subsystem, an action that is associated with the at least one identified key term while the online presentation is presented to the user by the content engager subsystem.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 2 is a more detailed schematic view of a subsystem of the system of FIG. 1;

FIG. 3 is a view of a screen of a graphical user interface of a content engager subsystem of one or more of FIGS. 1 and 2 illustrating an exemplary online presentation of the content enhancement service of the disclosure.

DETAILED DESCRIPTION OF THE DISCLOSURE

A content enhancement service is provided that may be operative to enable content consumers to engage with published content in an effective and/or efficient manner for bringing about meaningful impact.

Figure 1:
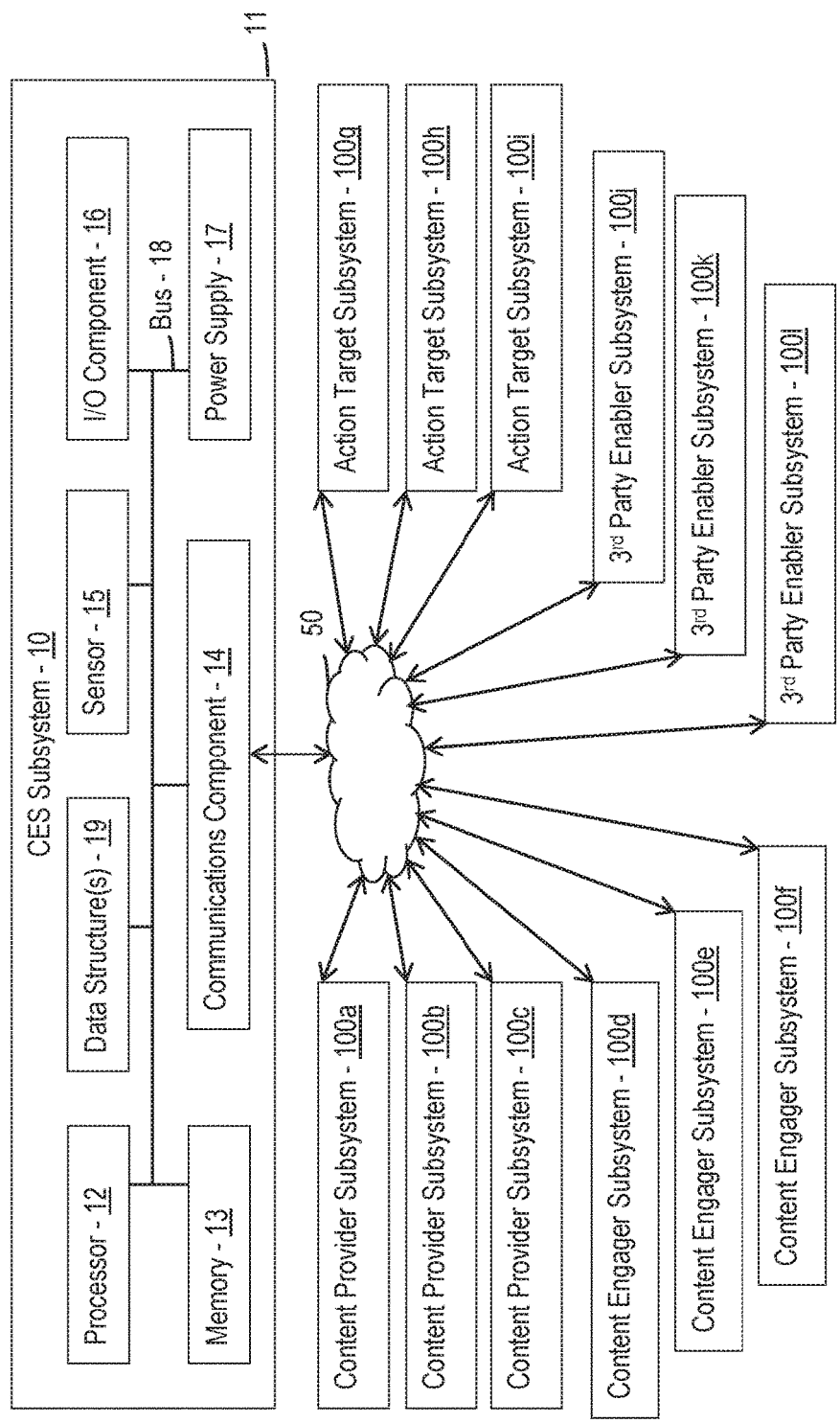
FIG. 1 is a schematic view of an illustrative system that may provide a content enhancement service of the disclosure.
Figure 4:
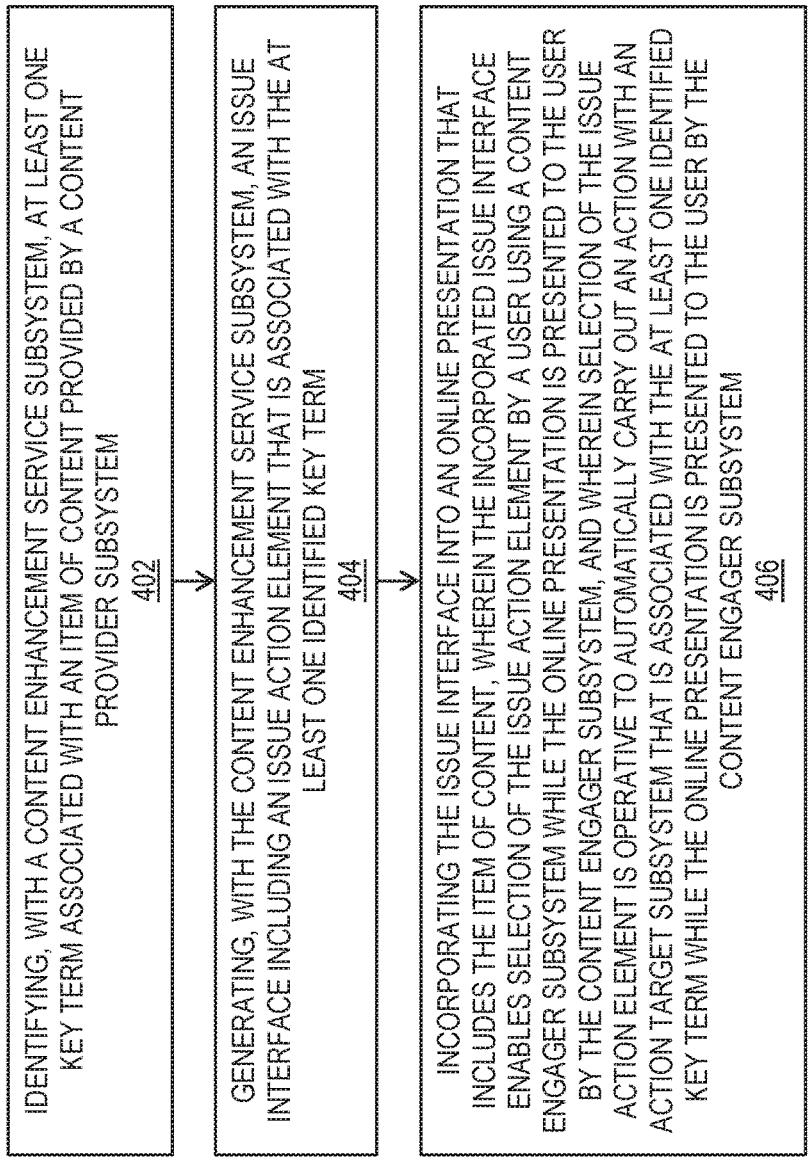
FIG. 4 is a flowchart of an illustrative process that may provide features of the content enhancement service of the disclosure.

FIG. 1 shows a system 1 in which a content enhancement service may be facilitated amongst various entities, FIG. 2 shows further details with respect to a particular embodiment of a subsystem of system 1, FIG. 3 is a view of a screen that may be representative of a graphical user interface of a content engager subsystem of one or more of FIGS. 1 and 2 presenting an exemplary online presentation of the content enhancement service of the disclosure, and FIG. 4 is a flowchart of an illustrative process for using the content enhancement service.

Description of FIG. 1 and FIG. 2

FIG. 1 is a schematic view of an illustrative system 1 in which a content enhancement service may be facilitated amongst various entities. For example, as shown in FIG. 1, system 1 may include a content enhancement service ("CES") subsystem 10, various subsystems 100 (e.g., one or more content provider ("CP") subsystems 100a-100c, one or more content engager ("CE") subsystems 100d-100f, one or more action target ("AT") subsystems 100g-100i, and/or one or more third party enablers ("TPE") subsystems 100j-100l, and at least one communications network 50 through which any two or more of the subsystems 10 and 100 may communicate. CES subsystem 10 may be operative to interact with any of the various subsystems 100 to provide a content enhancement service platform ("CESP") that may facilitate various content enhancement services, including, but not limited to, enabling content consumers to engage with published content in an effective and/or efficient manner for bringing about meaningful impact.

As shown in FIG. 2, and as described in more detail below, a subsystem 100 may include a processor component 112, a memory component 113, a communications component 114, a sensor component 115, an input/output ("I/O") component 116, a power supply component 117, and/or a bus 118 that may provide one or more wired or wireless communication links or paths for transferring data and/or power to, from, or between various other components of subsystem 100. I/O component 116 may include at least one input component (e.g., a button, mouse, keyboard, microphone, etc.) to receive information from a user of subsystem 100 and/or at least one output component (e.g., an audio speaker, video display, haptic component, etc.) to provide information to a user of subsystem 100, such as a touch screen that may receive input information through a user's touch on a touch sensitive portion of a display screen and that may also provide visual information to a user via that same display screen. Memory 113 may include one or more storage mediums, including for example, a hard-drive, flash memory, permanent memory such as read-only memory ("ROM"), semi-permanent memory such as random access memory ("RAM"), any other suitable type of storage component, or any combination thereof. Communications component 114 may be provided to allow one subsystem 100 to communicate with a communications component of one or more other subsystems 100 or subsystem 10 or servers using any suitable communications protocol (e.g., via communications network 50). Communications component 114 can be operative to create or connect to a communications network for enabling such communication. Communications component 114 can provide wireless communications using any suitable short-range or long-range communications protocol, such as Wi-Fi (e.g., a 802.11 protocol), Bluetooth, radio frequency systems (e.g., 1200 MHz, 2.4 GHz, and 5.6 GHz communication systems), infrared, protocols used by wireless and cellular telephones and personal e-mail devices, or any other protocol supporting wireless communications. Communications component 114 can also be operative to connect to a wired communications network or directly to another data source wirelessly or via one or more wired connections or a combination thereof. Such communication may be over the internet or any suitable public and/or private network or combination of networks (e.g., one or more networks 50). Sensor 115 may be any suitable sensor that may be configured to sense any suitable data from an environment of subsystem 100 or internal to subsystem 100 (e.g., light data via a light sensor, audio data via an audio sensor, location-based data via a location-based sensor system (e.g., a global positioning system ("GPS")), etc.). Power supply 117 can include any suitable circuitry for receiving and/or generating power, and for providing such power to one or more of the other components of subsystem 100. Subsystem 100 may also be provided with a housing 111 that may at least partially enclose one or more of the components of subsystem 100 for protection from debris and other degrading forces external to subsystem 100. Each component of subsystem 100 may be included in the same housing 111 (e.g., as a single unitary device, such as a laptop computer or portable media device) and/or different components may be provided in different housings (e.g., a keyboard input component may be provided in a first housing that may be communicatively coupled to a processor component and a display output component that may be provided in a second housing, and/or multiple servers may be communicatively coupled to provide for a particular subsystem). In some embodiments, subsystem 100 may include other components not combined or included in those shown or several instances of the components shown.

Processor 112 may be used to run one or more applications, such as an application that may be provided as at least a part of one data structure 119 that may be accessible from memory 113 and/or from any other suitable source (e.g., from CES subsystem 10 via an active internet connection). Such an application data structure 119 may include, but is not limited to, one or more operating system applications, firmware applications, communication applications, internet browsing applications (e.g., for interacting with a website provided by CES subsystem 10 for enabling subsystem 100 to interact with an online service of CES subsystem 10), CES applications (e.g., a web application or a native application that may be at least partially produced by CES subsystem 10 for enabling subsystem 100 to interact with an online service), or any other suitable applications. For example, processor 102 may load an application data structure 119 as a user interface program to determine how instructions or data received via an input component of I/O component 116 or via communications component 114 or via sensor component 115 or via any other component of subsystem 100 may manipulate the way in which information may be stored and/or provided to a user via an output component of I/O component 116 and/or to any other subsystem via communications component 114. As one example, an application data structure 119 may provide a user with the ability to interact with a content enhancement service or the CESP of EES subsystem 10, where such an application 119 may be a third party application that may be running on subsystem 100 (e.g., an application associated with CES subsystem 10 that may be loaded on subsystem 100 from CES subsystem 10 or via an application market) and/or that may be accessed via an internet application or web browser running on subsystem 100 (e.g., processor 112) that may be pointed to a uniform resource locator ("URL") whose target or web resource may be managed by CES subsystem 10 or any other remote subsystem. Each subsystem 100 may be a portable media device (e.g., a smartphone), a laptop computer, a tablet computer, a desktop computer, an appliance, a wearable electronic device, at least one web or network server (e.g., for providing an online resource, such as a website or native online application, for presentation on one or more other subsystems) with an interface for an administrator of such a server, and/or the like.

CES subsystem 10 may include a housing 11 that may be similar to housing 111, a processor component 12 that may be similar to processor 112, a memory component 13 that may be similar to memory component 113, a communications component 14 that may be similar to communications component 114, a sensor component 15 that may be similar to sensor component 115, an I/O component 16 that may be similar to I/O component 116, a power supply component 17 that may be similar to power supply component 117, and/or a bus 18 that may be similar to bus 118. Moreover, CES subsystem 10 may include one or more data sources or data structures or applications 19 that may include any suitable data or one or more applications (e.g., any application similar to application 119) for facilitating a content enhancement service or CESP that may be provided by CES subsystem 10 in conjunction with one or more subsystems 100. Some or all portions of CES subsystem 10 may be operated, managed, or otherwise at least partially controlled by an entity responsible for providing a content enhancement service to one or more clients or other suitable entities.

CES subsystem 10 may communicate with one or more subsystems 100 via communications network 50. Network 50 may be the internet or any other suitable network, such that when intercoupled via network 50, any two subsystems of system 1 may be operative to communicate with one another (e.g., a subsystem 100 may access information (e.g., from a data structure 19 of CES subsystem 10, as may be provided as a content enhancement service via processor 12 and communications component 14 of CES subsystem 10) as if such information were stored locally at that subsystem 100 (e.g., in memory component 113)).

Various clients and/or partners may be enabled to interact with CES subsystem 10 for enabling the content enhancement services and the CESP. For example, at least one content provider subsystem of system 1 (e.g., each one of the one or more content provider subsystems 100a-100c) may be operated by any suitable content provider ("CP") that may author, aggregate, publish, or otherwise present one or more pieces of content (e.g., textual and/or photographical and/or videographical and/or any other suitable type of consumable media, which may be editorial and/or promotional in nature) of the CESP, including, but not limited to, weblog posts, professional news articles, advertisements, and the like. At least one content engager subsystem of system 1 (e.g., each one of the one or more content engager subsystems 100d-100f) may be operated by any suitable content engager ("CE") that may consume or otherwise be exposed to any content provided by a CP subsystem and enabled by the CESP to perform one or more actions associated with that content (e.g., any suitable end user that may read or view any suitable enhanced content and that may interact with such enhanced content for bringing about meaningful impact). At least one action target subsystem of system 1 (e.g., each one of the one or more action target subsystems 100g-100i) may be operated by any suitable action target ("AT") that may have any suitable relationship to the subject matter of any suitable content provided by a CP subsystem and enabled by the CESP, such as a recipient of an action performed in association with the content (e.g., a recipient of a communication and/or donation generated in response to a content engager's selection of a particular action associated with the content), a medium for facilitating an action performed in association with the content (e.g., a social network operative to share a message generated in response to a content engager's selection of a particular action associated with the content, a financial service operative to securely transfer funds from one entity to another (e.g., PayPal), etc.), and/or the like. At least one third party enabler subsystem of system 1 (e.g., each one of the one or more third party enabler subsystems 100j-100l) may be operated by any suitable third party enabler ("TPE") that may be operative to enable at least partially any suitable operation provided by the CESP, such as a third party application that may be operative to process the subject matter of any content and identify any match(es) between such content subject matter and the subject matter of one or more actions to be enabled by the CESP, a third party application that may be operative to enable secure and seamless interactions (e.g., donations and/or communications between a content engager and an action target), a third party application that may be operative to enable the generation and/or analysis and/or sharing of reports indicative of the interaction of various entities with the CESP, and the like, although it is to be understood that one, some or all of the processes and/or deliverables that may be at least partially enabled by one or more third party enablers may instead be enabled entirely by CES subsystem 10 of the CESP.

Each subsystem 100 of system 1 (e.g., each one of subsystems 100a-100l) may be operated by any suitable entity for interacting in any suitable way with CES subsystem 10 (e.g., via network 50) for deriving value from and/or adding value to a service of the CESP of CES subsystem 10. For example, a particular subsystem 100 may be a server operated by a client/partner entity that may receive any suitable data from CES subsystem 10 related to any suitable content enhancement of the CESP provided by CES subsystem 10 (e.g., via network 50). Additionally or alternatively, a particular subsystem 100 may be a server operated by a client/partner entity that may upload or otherwise provide any suitable data to CES subsystem 10 related to any suitable content enhancement service of the CESP provided by CES subsystem 10 (e.g., via network 50).

Description of FIG. 3 and FIG. 4

To facilitate the following discussion regarding the operation of system 1 for providing a content enhancement service with CES subsystem 10 in conjunction with one or more subsystems 100, reference is made to one or more processes of FIG. 4, to various components of system 1 of the schematic diagrams of FIGS. 1 and 2, and to the view of the screen of FIG. 3 that may be representative of a graphical user interface of content engager subsystem 100d of one or more of FIGS. 1 and 2 presenting an exemplary online presentation 300 of the content enhancement service of the disclosure. FIG. 4 is a flowchart of an illustrative process 400 for enabling a user of a content engager subsystem (e.g., at least one of CE subsystems 100d-100f) to interact with media (e.g., online presentation 300 of FIG. 3) using a content enhancement service subsystem (e.g., CES subsystem 10), a content provider subsystem (e.g., at least one of CP subsystems 100a-100c), and an action target subsystem (e.g., at least one of AT subsystems 100g-100i), while FIG. 3 shows online presentation 300 that may be provided as a graphical user interface on a content engager subsystem. The operations described may be achieved with a wide variety of graphical elements and visual schemes. Therefore, the embodiment of FIG. 3 is not intended to be limited to the precise user interface conventions adopted herein. Rather, embodiments may include a wide variety of user interface styles and options.

For example, as shown in FIG. 3, a graphical user interface ("GUI") of a content engager subsystem may be configured to display online presentation 300 with at least one item of content 354 and an issue interface 356. In some embodiments, online presentation may be displayed to a user on a display I/O component 116 of content engager subsystem 100d via an online resource of content provider subsystem 100a (e.g., a native application of the CP subsystem or a web browser pointing to a URL of the CP subsystem that may be running on content engager subsystem 100d (e.g., as at least a portion of a data structure 119 of subsystem 100d)), where content provider subsystem 100a may be the source of the at least one content item 354. As shown, online presentation 300 may also include a header or link or other provider identifier 352 that may be operative to identify the entity managing the content provider subsystem (e.g., CP provider subsystem 100a) and/or the online resource with which the user of content engager subsystem 100d may be interfacing to experience online presentation 300. Other suitable content, such as advertisement content 360 and/or links 362 to other items of content may be provided by online presentation 300 (e.g., at the discretion of the content provider or otherwise) and may be provided in any suitable relationship with respect to content 354 and issue interface 356 in online presentation 300 (e.g., at the discretion of the content provider or otherwise). As described herein, the screen of online presentation 300 of FIG. 3 may include various user interface elements. Additionally or alternatively, various other types of non-visual information may be provided to a user via various other I/O components 116 output components 112 of content engager subsystem 100d (e.g., audible and/or haptic information that may be operative to convey any suitable information (e.g., with respect to content item(s) 354 and/or issue interface 356)).

FIG. 4 is a flowchart of an illustrative process 400 for enabling a user of a content engager subsystem (e.g., at least one of CE subsystems 100d-100f) to interact with media using a content enhancement service subsystem (e.g., CES subsystem 10), a content provider subsystem (e.g., at least one of CP subsystems 100a-100c), and an action target subsystem (e.g., at least one of AT subsystems 100g-100i). At step 402 of process 400, the content enhancement service subsystem may identify at least one key term associated with an item of content provided by the content provider subsystem. For example, any CP subsystem may generate, curate, compile, or otherwise provide any suitable media content of any suitable type (e.g., at least one media item with text content, audio content, video content, visual content, and/or the like). In some embodiments, a CP provider may be a journalistic website, such as huffingtonpost.com or any other suitable online media provider, a content aggregator, such as YouTube.com for videos or EarWolf.com for audio podcasts or any other collector of any suitable type(s) of user generated content, or any other suitable online provider of any suitable content. One particular key term (e.g., keyword or key phrase) or any other number of particular terms (e.g., two or more keywords or key phrases) may be of interest to CES subsystem 10 or to a content provider subsystem or to an action target subsystem or to any other subsystem associated with CES subsystem 10 of system 1, and any particular item of content provided by a CP subsystem may be analyzed or otherwise interacted with to identify whether or not the content item is associated with any particular keyword.

For example, in some embodiments, the CES subsystem (e.g., an administrator of CES subsystem 10) may be operative to define a list of key terms of interest and may provide that list to each CP subsystem, such that when a CP subsystem makes a new item of content available, the CP subsystem may determine whether that new content item is associated with any of the listed key terms of interest. For example, a CP subsystem may share with the CES subsystem a new content item or a unique identifier identifying the content item as well as an indication of the one or more key terms associated with that content item. Alternatively or additionally, a CP subsystem may share with the CES subsystem a new content item and the CES subsystem may be operative to identify whether one or more key terms are associated with that content item. Alternatively or additionally, a CP subsystem may share a new content item with a third party enabler subsystem (e.g., at least one of TPE subsystems 100j-100l), either directly or via the CES subsystem, and the TPE subsystem may be operative to identify whether one or more key terms of interest are associated with that content item. In such embodiments, the TPE subsystem and/or the CES subsystem may be operative to act as a parser or web crawler or any other suitable entity that may be operative to process the content of a media content item or to process a list of pre-defined content key terms for a media content item to determine whether or not the content item is associated with any one or more key terms of interest (e.g., as may be enabled by a TPE subsystem). This may be done automatically at periodic moments in time or may be done in response to a particular request to identify new content items that may be associated with one or more key terms of interest or may be done in response to a new key term of interest being defined. In some embodiments, a key term of interest may be defined by the CES subsystem (e.g., an administrator thereof). Additionally or alternatively, a key term of interest may be defined by the CP subsystem (e.g., an administrator thereof). In some embodiments, key terms identified in a content item may be flagged and provided to an administrator (e.g., of the CES subsystem and/or of the CP subsystem) to request administrator confirmation that the identification is accurate (e.g., via e-mail and/or one-click approval). As just one example, a key term of interest may be "Poverty" or "Poverty in Country 'PQR'" or "Country 'PQR'" and, at step 402, one or more content items associated with poverty and/or poverty in country 'PQR' and/or country 'PQR' may be identified using any suitable technique(s) (e.g., by scanning any text of a content item or by leveraging any suitable automatic content recognition technology (e.g., by analyzing any acoustic fingerprints of any audio of a media item) or the like). Once a content item has been identified to be associated with at least on key term of interest, a unique identifier associated with the content item (e.g., a URL to the online item and/or a 4-character alphanumeric identifier unique to the system) may be stored or otherwise made available to the CES subsystem (e.g., in a portion of a data structure 19 of CES subsystem 10) and an association between that content item and any key terms of interest may also be recorded or otherwise made available to the CES subsystem (e.g., in a portion of a data structure 19 of CES subsystem 10). For example, a portion of data structure 19 of CES subsystem 10 may be a CESP database that may be operative to track the existence of any suitable number of content items and any suitable number of key terms of interest and any suitable association(s) between each content item and any one or more of the key terms of interest.

With respect to FIG. 3, at least one content item 354 of content provider subsystem 100a may include an item 354a of textual content, which may state:

This morning, a report released by "MNO" indicates that the poverty level in the country of "PQR" has risen to an historic high.

Comments made this morning by President "STU" of "PQR" indicate that he intends to consider a new bill "VWX" that will provide immediate relief to the poor of his country.

However, even that bill will only do so much, as non-profit organization "YZA" estimates at least $5,000,000 of additional relief will be needed to stem the tide, and/or an item 354b of audio and/or visual ("A/V") content, which may include any suitable media associated with "Poverty in Country 'PQR'". Therefore, a key term of interest for "Poverty in Country 'PQR'" may be identified at step 402 as being associated with content item 354 (e.g., associated with either or both of content item 354a and content item 354b of content item 354).

At step 404 of process 400, the content enhancement service subsystem may define or otherwise generate an issue interface that may include at least one issue action element that may be associated with at least one key term (e.g., the at least one key term identified at step 402). Once at least one key term of interest has been defined (e.g., by an administrator of CES subsystem 10 or a CP subsystem or an AT subsystem or automatically (e.g., due to trending topics online (e.g., on Twitter or elsewhere) or due to any other suitable events), an issue interface including at least one issue action element associated with at least one such key term of interest may be generated. This may be done prior to any content item being identified as associated with the key term of interest (e.g., prior to step 402) or in response to a content item being identified as associated with the key term of interest (e.g., after step 402) or concurrently with step 402. An issue interface may include any suitable code, such as responsive code (e.g., responsive HTML code or DHTML or flash or the like), that may be inserted or otherwise incorporated into an online presentation of a content item (e.g., code 357 of issue interface 356 of online presentation 300 of content item 354). For example, the issue interface may be a web widget or a software widget for the web or any other suitable mechanism (e.g., a portlet, a web part, a gadget, a badge, a module, a snippet, a flake, an iframe, and/or the like), which may be an application that may be installed and/or executed within a webpage or other online resource by an end user (e.g., a user of a content engager subsystem when the online presentation is presented to the user by the content engager subsystem). The issue interface may be a transient or auxiliary application that may occupy a portion of the online presentation (e.g., where another portion may be occupied by the content item) and may be operative to carry out at least one useful function in cooperation with information that may be fetched from another source (e.g., from CES subsystem 10) and presented in a single presentation (e.g., along with the content item in a presentation on a CE subsystem).

The issue interface may include one or more issue action elements that may be associated with a particular key term of interest. An issue action element may be of any suitable type for carrying out any suitable action when selected, including, but not limited to an issue action element that, when selected by an end user of the issue interface, may be operative to send a particular communication of particular content, an issue action element that, when selected by an end user of the issue interface, may be operative to donate a particular amount of funds (e.g., as may be edited by the end user) to a particular target account (e.g., as may be defined by an administrator of CES subsystem 10) using a particular TPE subsystem, an issue action element that, when selected by an end user of the issue interface, may be operative to authentically add the end user's name to a particular petition (e.g., as may be identified by an administrator of CES subsystem 10) using a particular TPE subsystem (e.g., sign a petition to end poverty in country PQR using a petition service that may be provided by a TPE subsystem), an issue action element that, when selected by an end user of the issue interface, may be operative to at least partially complete a particular poll (e.g., as may be defined or identified by an administrator of CES subsystem 10) using a particular TPE subsystem (e.g., complete a poll indicative of the end user's thoughts on poverty in country PQR using a polling service that may be provided by a TPE subsystem), and/or the like. Any suitable application programming interface ("API") of any suitable TPE subsystem(s) may be leveraged for generating and/or enabling such functionality of such issue action element(s) of an issue interface.

As shown in FIG. 3, issue interface 356 may include one or more issue action elements 358 (e.g., issue action elements 358a, 358b, and 358c) that may be associated with the key term of interest for "Poverty in Country 'PQR'" (e.g., as may have been identified at step 402 to be associated with content item 354). As just one example, issue action element 358a may be operative to send a particular communication of particular content associated with "Poverty in Country 'PQR'" using a particular TPE subsystem when issue action element 358a is selected. For example, issue action element 358a may be operative to send the pre-defined message "@PresidentSTU, please pass bill VWX to save the poor of PQR—see more at www.CPsubsystem.com/content354" using a particular action target subsystem "BCD" (e.g., AT subsystem 100g, which may be a social network, such as Twitter, or any suitable electronic mail system, or the like) to a particular target participant of that action target subsystem (e.g., President STU of Country PQR) when a user presses or otherwise selects button 359a of issue action element 358a (e.g., any suitable GUI element) of online presentation 300 (e.g., where a link "www.CPsubsystem.com/content354" of that message may be a link to online presentation 300 so viewers of the message (e.g., on AT subsystem BCD) may easily be able to access online presentation 300). While the message of issue action element 358a may be pre-defined by an administrator of CES subsystem 10, which may be facilitated by CES subsystem 10 to be any suitable entity, such as an administrator of any appropriate subsystem 100 of system 1 with access to that functionality of CES subsystem 10, in some embodiments, that message may be edited in any suitable manner by the end user interfacing with online presentation 300 prior to sending that message. Issue action element 358a may also include any suitable action data 361a that may be continuously updated (e.g., by CES subsystem 10) to indicate any suitable data related to user selection of issue action element 358a (e.g., the number of times a message of issue action element 358a has been sent by any user at any time, by any user while viewing content 354, by any user in the last 24 hours, etc. and/or the number of times a message of issue action element 358a must be sent to meet any particular goal). In some embodiments, as shown, issue action element 358a may be operative to enable the user to enter personal credentials (e.g., identification ("ID") and password) associated with action target subsystem BCD to enable the communication of the message using that AT subsystem. Alternatively, CES subsystem 10 and/or the CE subsystem 100 may already have proven authentication of the end user's relationship to AT subsystem BCD such that the action of issue action element 358a may automatically be carried out without specifically requiring that information at issue action element 358a.

As another example, issue action element 358b may be operative to donate a particular amount of funds (e.g., as may be edited by the end user) to a particular target account (e.g., as may be defined by an administrator of CES subsystem 10 or otherwise) that may be associated with "Poverty in Country 'PQR'" using a particular TPE subsystem when issue action element 358*b* is selected. For example, issue action element 358*b* may be operative to securely and efficiently transfer any particular amount of funds from a financial instrument of the end user to a financial instrument of a trusted target "YZA" that may be established to help eradicate poverty in country "PQR" (e.g., AT subsystem 100*h*, which may be a trusted non-profit organization or the like) using a particular action target subsystem "EFG" (e.g., AT subsystem 100*i* or a TPE subsystem or a portion of CES subsystem 10, which may be operative to securely transfer funds, such as PayPal.com) when a user presses or otherwise selects button 359*b* of issue action element 358*b* of online presentation 300 (e.g., any suitable GUI element). While the amount to be donated with issue action element 358*b* may be pre-defined by an administrator of CES subsystem 10, which may be facilitated by CES subsystem 10 to be any suitable entity, such as an administrator of any appropriate subsystem 100 of system 1 with access to that functionality of CES subsystem 10, in some embodiments, that amount or the periodicity with which that amount may be donated, may be edited in any suitable manner by the end user interfacing with online presentation 300 prior to making the donation through selection of button 359*b*. Issue action element 358*b* may also include any suitable action data 361*b* that may be continuously updated (e.g., by CES subsystem 10) to indicate any suitable data related to user selection of issue action element 358*b* (e.g., the number of times a donation of issue action element 358*b* has been made by any user at any time, by any user while viewing content 354, by any user in the last 24 hours, etc. and/or the amount of donations of issue action element 358*b* must be sent to meet any particular goal). In some embodiments, as shown, issue action element 358*b* may be operative to enable the user to enter personal credentials (e.g., identification ("ID") and password) associated with action target subsystem EFG to enable the donation using that AT subsystem. Alternatively, CES subsystem 10 and/or the CE subsystem 100 may already have proven authentication of the end user's relationship to AT subsystem EFG such that the action of issue action element 358*b* may automatically be carried out without specifically requiring that information at issue action element 358*b*.

As another example, issue action element 358*c* may be operative to donate a particular amount of time (e.g., as may be edited by the end user) to a particular target account (e.g., as may be defined by an administrator of CES subsystem 10 or otherwise) that may be associated with "Poverty in Country 'PQR'" using a particular TPE subsystem when issue action element 358*c* is selected. For example, issue action element 358*c* may be operative to reliably volunteer a certain amount of time or energy of the end user to a trusted target "HIJ" that may be established to help eradicate poverty in country "PQR" (e.g., AT subsystem 100*h*, which may be a trusted non-profit organization or the like) using a particular action target subsystem "KLM" (e.g., AT subsystem 100*i* or a TPE subsystem or a portion of CES subsystem 10, which may be operative to reliably enable a user to donate specific time or energy to a cause) when a user presses or otherwise selects button 359*c* of issue action element 358*c* of online presentation 300 (e.g., any suitable GUI element). While the amount to be donated with issue action element 358*c* may be pre-defined by an administrator of CES subsystem 10, which may be facilitated by CES subsystem 10 to be any suitable entity, such as an administrator of any appropriate subsystem 100 of system 1 with access to that functionality of CES subsystem 10, in some embodiments, that amount or the periodicity with which that amount may be donated, may be edited in any suitable manner by the end user interfacing with online presentation 300 prior to making the donation through selection of button 359*c*. Issue action element 358*c* may also include any suitable action data 361*c* that may be continuously updated (e.g., by CES subsystem 10) to indicate any suitable data related to user selection of issue action element 358*c* (e.g., the number of times a donation of issue action element 358*c* has been made by any user at any time, by any user while viewing content 354, by any user in the last 24 hours, etc. and/or the amount of donations of issue action element 358*c* must be sent to meet any particular goal). In some embodiments, as shown, issue action element 358*c* may be operative to enable the user to enter personal credentials (e.g., identification ("ID") and password) associated with action target subsystem KLM to enable the donation using that AT subsystem. Alternatively, CES subsystem 10 and/or the CE subsystem 100 may already have proven authentication of the end user's relationship to AT subsystem KLM such that the action of issue action element 358*c* may automatically be carried out without specifically requiring that information at issue action element 358*c*. It is to be noted that, while entities "PQR", "STU", "VWX", and "YZA" of content item 354 may be referenced or utilized in any suitable ways by one or more of issue action elements 358*a* and 358*b* of issue interface 356 (e.g., as may be automatically correlated using software of the CESP or by an administrator of the CESP), neither entity "HIJ" nor entity "KLM" of issue action element 358*c* may be a portion of content item 354 but may instead be an entity identified by an entity generating issue action element 358*c* (e.g., by an administrator of the CESP and not necessarily from the content item(s) of the online presentation).

At step 406 of process 400, the issue interface generated at step 404 may be incorporated into an online presentation that includes the item of content of step 402, where the incorporated issue interface may enable selection of the issue action element by the user using a content engager subsystem while the online presentation is presented to the user by the content engager subsystem, and where selection of the issue action element is operative to automatically carry out, with the action target subsystem, an action that is associated with the at least one identified key term while the online presentation is presented to the user by the content engager subsystem. In some embodiments, the action of process 400 may include sending an online communication that is associated with the at least one identified key term to the action target subsystem or to a participant of the action target subsystem (e.g., the action of issue action element 358*a*). Additionally or alternatively, the action of process 400 may include sending funds to the action target subsystem or to a participant of the action target subsystem (e.g., the action of issue action element 358*b*). Additionally or alternatively, the action of process 400 may include donating time to the action target subsystem or to a participant of the action target subsystem (e.g., the action of issue action element 358*c*). Additionally or alternatively, the action of process 400 may include signing a petition that is associated with the at least one identified key term. Additionally or alternatively, the action of process 400 may include sharing a message that is associated with the at least one identified key term on a social network, wherein such a message may be at least partially defined by the content enhancement service subsystem. Additionally or alternatively, the content enhancement service subsystem of process 400 may be operative to track the number of times the issue action element is selected, where that data may be included as a portion of the issue interface (e.g., by action data 361*a*,

361b, 361c, and the like). Additionally or alternatively, the content enhancement service subsystem of process 400 may be operative to track the number of times the issue interface is incorporated into any online presentation, where that data may be included as a portion of the issue interface (e.g., by action data 361a, 361b, 361c, and the like). Additionally or alternatively, with respect to process 400, the issue interface may also include another issue action element that is associated with the at least one identified key term, the incorporated issue interface may enable selection of the other issue action element by the user using the content engager subsystem while the online presentation is presented to the user by the content engager subsystem, selection of the other issue action element may be operative to automatically carry out another action (e.g., with another action target subsystem) that is associated with the at least one identified key term while the online presentation is presented to the user by the content engager subsystem, and the action may be different than the other action (e.g., both issue action element 358a and issue action element 358b may be simultaneously included as different portions of issue interface 356 of online presentation 300 for carrying out different actions). After an action is carried out, the CESP may be operative to enable the end user to share its participation (e.g., selection of the issue action element) on any suitable social network (e.g., using any suitable AT subsystem).

The online presentation may be at least partially defined by the CP subsystem responsible for the content item, where the CP subsystem may be operative to dictate the location and/or size and/or any other suitable characteristic of the issue interface as it may be incorporated into the online presentation (e.g., an administrator of the CP subsystem may be operative to determine the size and/or shape and/or position and/or other appropriate features of issue interface 356 with respect to that of content item(s) 354, advertisement content 360, and/or links 362 of presentation 300). An administrator of the CP subsystem may be enabled to determine whether or not the issue interface is incorporated into the online presentation of the content item. The online presentation may be any suitable online presentation that may be made available to any suitable end user via any suitable end user subsystem, such as any suitable content engager subsystem (e.g., CE subsystem 100d that may be a portable media device of an end user) that may be running an online resource of the CP subsystem (e.g., a native application of the CP subsystem or a web browser pointing to a URL of the CP subsystem). Issue interface code (e.g., code 357) may be incorporated into any code of the CP subsystem for generating the online presentation such that the issue interface code may be operative to define an appropriate issue interface to an end user of a CE subsystem that may be presenting the online presentation.

In some embodiments, a component of CESP code (e.g., responsive HTML code or otherwise), such as code 357, may be automatically or manually inserted in a presentation to be presented online (e.g., a presentation including at least one CP content item (e.g., content 354) or template that may be published on a website or in an app of the CP). Every time an online presentation including a content item and the CESP code is presented online, the code may be operative to consult the CESP of CES subsystem 10 (e.g., via any suitable web-services) to determine whether or not the content item has already been processed for determining its association with any key terms of interest and/or to determine and access any particular issue action element(s) for incorporation in an issue interface of that online presentation (e.g., based on any rules or associations or any suitable definitions that may have been generated automatically by the CES subsystem or by any appropriate administrator thereof). Therefore, CESP code 357 may enable the presentation of issue interface 356 that may be built using a responsive design that may dynamically adapt to any online environment of a CE subsystem that may be presenting online presentation 300 to an end user (e.g., any suitable internet browser or native application running on a CE subsystem of an end user). The CESP code may be operative to determine whether the associated content item has been identified as including a key term of interest, if a key term is identified as associated with the content item then incorporate an appropriate issue interface into the online presentation. Moreover, as mentioned, the CES subsystem may be operative to track the number of times any action associated with an issue action element of an issue interface has been carried out, such that an issue interface presented to an end user may include an up to date current count of the number of times each issue action element has been selected by all end users or any other suitable data (e.g., as action data 361a), which may help encourage an end user to select an issue action element. The issue interface presented to an end user with at least one issue action element associated with a key term of interest associated with the content item may be the main mechanism with which end users may interact with the CESP of the CES subsystem. The issue interface may be operative to enable a user to select an issue action element of the issue interface for automatically carrying out an action associated with that issue action element without leaving the online presentation of the content item and issue interface (e.g., without using an app or website of the CP subsystem and/or without any pop-up windows), such that no new or additional online presentation associated with the action being carried (e.g., an online presentation associated with an AT subsystem associated with the action need not be opened or may be opened concurrently or adjacent to the online presentation of the CP subsystem). In some embodiments, an end user may provide (e.g., in the issue interface or otherwise) certain credential information associated with the end user's ability to use an AT subsystem such that the seamless background carrying out of one or more actions may be enabled with respect to that AT subsystem (e.g., an end user may log-in to its account with a social network for enabling the CESP to automatically carry out an action using that social network (e.g., the end user may log-in to its Twitter account (e.g., within issue action element 358a when Twitter is AT subsystem BCD) such that the CESP may be operative to automatically send a particular tweet with the end user's Twitter handle in response to the end user selecting a particular issue action element of an issue interface) and/or an end user may log-in to its account with a payment processor for enabling the CESP to automatically carry out a donation action using that payment processor (e.g., the end user may log-in to its PayPal account (e.g., within issue action element 358b when PayPal is AT subsystem EFG) such that the CESP may be operative to automatically transfer funds for a donation to a particular fund from the end user's PayPal account in response to the end user selecting a particular issue action element of an issue interface)).

CES subsystem 10 may be operative to provide a content enhancement service platform ("CESP") that may be accessible by any suitable entities (e.g., administrators of CES subsystem 10 or any managers of any other subsystems distinct from CES subsystem 10, such as approved managers of one or more CP subsystems or TPE subsystems, or the like) by any suitable techniques (e.g., via an internet browser-based platform or otherwise). Such a platform may enable any suitable interfacing entity to view or otherwise to interact with any suitable data (e.g., of a data structure 19 of CES subsystem 10), including, but not limited to, content item management, key term management, issue action element management, issue interface management, content publisher management, action target management, data analytics management, TPE management and connections to one or more TPEs, and/or the like. Key terms of interest may be specific to one or more particular CPs (e.g., a particular key term may only be identified for content items by one or more particular CPs) or key terms of interest may be applicable to all CPs. If multiple key terms are identified in a particular content item, multiple issue interfaces may be incorporated into an online presentation of that content item, each issue interface with one or more issue action elements associated with a particular one of the identified key terms, or a single issue interface may be provided that includes multiple issue action elements, different ones of which may be associated with different respective ones of the identified key terms. A CP subsystem (e.g., a user/administrator of a CP subsystem that may be trusted by CES subsystem 10) may be operative to interact with the CESP to obtain data indicative of the number of times an end user has selected any particular issue action element of any issue interface incorporated into any online presentation of that CP or to obtain the content of such end user interaction (e.g., poll responses or total funds donated, etc.) or otherwise. An AT (e.g., a user/administrator of an AT subsystem that may be trusted by CES subsystem 10) may be operative to interact with the CESP to obtain data indicative of the number of times an end user has selected any particular issue action element of any issue interface incorporated into any online presentation where the issue action element carries out an action with that AT or otherwise. The CESP may be operative to track and provide analytics (e.g., alone or through the use of one or more TPE subsystems) that may provide any suitable reports regarding any suitable data, such as the number and/or identification of content items associated with each key term and/or each CP, interaction rate (e.g., how many end users interacted with any issue interface), completion rate (e.g., how many users completed an action through selection of an issue action element), and/or the like.

It is understood that the steps shown in process 400 of FIG. 4 are merely illustrative and that existing steps may be modified or omitted, additional steps may be added, and the order of certain steps may be altered. The CESP may be operative to provide opportunities to an end user to take an action associated with any content item that the user is interacting with (e.g., consuming via an online presentation), where the actions may be curated or otherwise defined by a management entity of the CES subsystem such that the actions may be trusted by the end user (e.g., the CESP and/or each issue interface and/or each issue action element may be branded (see, e.g., issue interface brand 355 of issue interface 356 of online presentation 300) and that brand may be trusted by end users and CPs and ATs alike for curating trusted actions for any suitable key terms of interest), thereby cutting out the extensive research otherwise needed by an end user to find credible solutions. This may enable appropriate actions to be facilitated in an easier, faster, and/or more accessible manner than ever before, increase the number of actions taken with respect to issues associated with any key terms of interest, and/or promote educated and credible activism with respect to any issues (e.g., social responsibility issues or otherwise), thereby providing tremendous value to end users. Therefore, social impact actions may be matched with relevant content in a seamless and easy manner. The CESP may be designed to easily connect a content engager, such as an end user consuming content 354 of online presentation 300, with appropriate actions that they may quickly and securely affect (e.g., via selection of one or more of buttons 359a-359c) in the same environment (e.g., online presentation 300) that content 354 is provided to the content engager and at the same time that content 354 is provided to the content engager. CESP obviates the need for a content engager to seek out appropriate actions to take in different environments from that of the content (e.g., to open another online resource (e.g., website, application, etc.) to affect an action associated with the content), but instead enables a content engager to immediately affect an action associated with the content in the native environment of the content right when the content engager consumes the content. The CESP facilitates a qualitatively better content engaging experience to take qualitatively better actions. When a content engager is consuming content of an online presentation related to a key term, actions associated with that key term (e.g., actions to fight for an issue associated with the key term, actions to share a perspective on an issue associated with the key term, etc.) and the ability to affect those actions may be right at the content engager's fingertips (e.g., sign a petition in support of Food Aid Reform in the U.S., e-mail Congress to support safe access to clean water and sanitation, tweet to call for funds needed to enable better access to schools for girls in developing regions, or take a quiz to reinforce your knowledge on global issues). The CESP may be operative to enable a content engager to earn points for each action of the CESP carried out by that content engager, where such earned points may be redeemable by the content engager via the CESP for concert tickets and music events and other products, servicers, or experiences.

The CESP may appeal to content providers by enabling their content to be associated with actions that may reflect a charitable or social good with the CP brand and/or by encouraging the end user audience of the CP to spend more time interacting with the content via the online presentation of that CP content (e.g., increasing time and engagement of CP end users with content). A CP may not need to have any familiarity whatsoever with any actions that might be associated with any key terms that may be identified as associated with the CP content. Instead, the CP may rely fully or at least partially on the CESP of CES subsystem 10 to process CP content (e.g., content 354) to appropriately generate and incorporate an issue interface into an online presentation of the CP's content. The CESP may be a service utilized by any and all content providers for any suitable content with respect to any suitable key terms and/or any suitable actions, where such key terms and/or actions may be defined by the CP and/or by CES subsystem 10. An administrator of a CP subsystem may be enabled to interact with a user interface of the CESP to at least partially generate an appropriate issue action element or issue interface that may then be approved by the CESP before enabling incorporation thereof into an online presentation branded by the CESP. The CESP may appeal to particular action targets (e.g., charitable NGOs that may be the beneficiary of donation actions) by enabling increased actions and/or by increasing awareness about the action target in relevant contexts that are normally not associated in any way with that action target (e.g., content generated by CPs that are unknown to the action target and/or that do not know the action target). The CESP may be an adaptive platform that may be used for various types of content and/or for various types of key terms and/or for various intents (e.g., good will, marketing, sales, etc.) and/or with various types of actions using various types of action targets. The CESP may enable an interactive tool placed in an online presentation of content that allows end users to take applicable meaningful action seamlessly and instantly (e.g., to act on the news—to take action on an issue—to connect content to impact, such that content (e.g., news, etc.) of an end user presentation may not just be information to consume, but also an agent, steward, or conduit for an opportunity to act).

Further Description of FIGS. 1-4

One, some, or all of the processes described with respect to FIGS. 1-4 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 13 and/or data structure 19 of FIG. 1 and/or memory 113 and/or data structure 119 of FIG. 2). In other embodiments, the computer-readable medium may be a transitory computer-readable medium. In such embodiments, the transitory computer-readable medium can be distributed over network-coupled computer systems so that the computer-readable code may be stored and executed in a distributed fashion. For example, such a transitory computer-readable medium may be communicated from a CES subsystem 10 to a subsystem 100, from a subsystem 100 to CES subsystem 10, and/or from one subsystem 100 to another subsystem 100 using any suitable communications protocol (e.g., the computer-readable medium may be communicated to a subsystem 100 via communications component 14/114 (e.g., as at least a portion of a data structure 119)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of the disclosure may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

While there have been described systems, methods, and computer-readable media for a content enhancement service, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Therefore, those skilled in the art will appreciate that the invention can be practiced by other than the described embodiments, which are presented for purposes of illustration rather than of limitation.

What is claimed is:

1. A method of enabling a user of a content engager subsystem to interact with media using a content enhancement service subsystem, a content provider subsystem, and an action target subsystem, the method comprising:

defining, with the content enhancement service subsystem, an index associating at least one key term to an action target subsystem and an associated action, independent of content items;

identifying, with the content enhancement service subsystem, at least one key term associated with an item of content provided by the content provider subsystem;

generating, with the content enhancement service subsystem, an issue interface comprising an issue action element that is associated with the at least one identified key term;

determining that an action associated with the issue action element requires authentication on the action target subsystem in order to complete the action; and incorporating the issue interface into an online presentation that comprises the item of content to generate an integrated display of the content item and the issue action element in the online presentation, wherein:

the incorporated issue interface enables selection of the issue action element by the user using the content engager subsystem while the online presentation is presented to the user by the content engager subsystem and entry or retrieval of authentication information for the action target subsystem; and responsive to selection of the issue action element in the online presentation, the system is configured to automatically execute a secure operation on the action target subsystem, the action target subsystem comprising a third party system in communication with the system over one or more communication networks, and requiring authentication information to execute the secure operation that is associated with the at least one identified key term, while the online presentation is presented to the user by the content engager subsystem.

2. The method of claim 1, wherein the action comprises sending an online communication that is associated with the at least one identified key term to a participant of the action target subsystem.

3. The method of claim 1, wherein the action comprises sending funds to a participant of the action target subsystem.

4. The method of claim 1, wherein the action comprises signing a petition that is associated with the at least one identified key term.

5. The method of claim 1, wherein the action comprises sharing a message that is associated with the at least one identified key term on a social network.

6. The method of claim 5, wherein the message is at least partially defined by the content enhancement service subsystem.

7. The method of claim 1, wherein the content enhancement service subsystem is operative to track the number of times the issue action element is selected.

8. The method of claim 1, wherein the content enhancement service subsystem is operative to track the number of times the issue interface is incorporated into any online presentation.

9. The method of claim 1, wherein:
the issue interface further comprises another issue action element that is associated with the at least one identified key term;
the incorporated issue interface enables selection of the other issue action element by the user using the content engager subsystem while the online presentation is presented to the user by the content engager subsystem;
selection of the other issue action element is operative to automatically carry out another action with another action target subsystem that is associated with the at least one identified key term while the online presentation is presented to the user by the content engager subsystem; and the action is different than the other action.

10. The method of claim 1, wherein incorporating the issue interface includes determining a display location for introducing the issue interface, the action item, and an authentication interface into a single display with the content item.

11. The method of claim 1, further comprising accessing the index to match the at least one key terms from content items to keys terms in the index.

12. The method of claim 1, wherein the content item comprises video content and the act of incorporating the issue interface into the online presentation that comprises the item of content to generate the integrated display of the content item and the issue action element in the online presentation includes an act of incorporating the issue interface into the online presentation of the video content.

13. A non-transitory computer-readable storage medium storing at least one program, the at least one program comprising instructions, which, when executed by at least one processor of a content enhancement service subsystem, cause the at least one processor to:
define an index associating at least one key term to an action target subsystem and an associated action, independent of content items;
identify at least one key term associated with an item of content provided by a content provider subsystem;
generate an issue interface comprising an issue action element that is associated with the at least one identified key term;
determine that an action associated with the issue action element requires authentication on the action target subsystem in order to complete the action;
incorporate the issue interface into an online presentation that comprises the item of content to generate an integrated display of the content item and the issue action element in the online presentation, wherein:
the incorporated issue interface enables selection of the issue action element by a user using a content engager subsystem while the online presentation is presented to the user by the content engager subsystem and enables entry or retrieval of authentication information for the action target subsystem; and
responsive to selection of the issue action element in the online presentation, execute a secure operation on an action target subsystem the action target subsystem comprising a third party system in communication with the system over one or more communication networks, and requiring authentication information to execute the secure operation that is associated with the at least one identified key term while the online presentation is presented to the user by the content engager subsystem.

14. A content enhancement service subsystem in a system comprising a content provider subsystem, a content engager subsystem, and an action target subsystem, the content enhancement service subsystem comprising:
an online communications component; and
a processor that:
defines an index associating at least one key term to an action target subsystem and an associated action, independent of content items;
identifies at least one key term associated with an item of content provided by the content provider subsystem;
generates an issue interface comprising an issue action element that is associated with the at least one identified key term;
determines that an action associated with the issue action element requires authentication on the action target subsystem in order to complete the action;
incorporates, via the online communications component, the issue interface into an online presentation that comprises the item of content to generate an integrated display of the content item and the issue action element in the online presentation, wherein:
the incorporated issue interface enables selection of the issue action element by a user using the content engager subsystem while the online presentation is presented to the user by the content engager subsystem and entry or retrieval of authentication information for the action target subsystem; and
responsive to selection of the issue action element in the online presentation, the content enhancement service subsystem is configured to automatically execute a secure operation on the action target subsystem, the action target subsystem comprising a third party system in communication with the system over one or more communication networks, and requiring authentication information to execute the secure operation that is associated with the at least one identified key term while the online presentation is presented to the user by the content engager subsystem.

15. The content enhancement service subsystem of claim 14, wherein the action comprises sending an online communication that is associated with the at least one identified key term to a participant of the action target subsystem.

16. The system of claim 15, wherein the content item comprises video content and the processor incorporates, via the online communications component, the issue interface into the online presentation that comprises the video content to generate the integrated display.

17. The content enhancement service subsystem of claim 14, wherein the action comprises sending funds to a participant of the action target subsystem.

18. The content enhancement service subsystem of claim 14, wherein the action comprises signing a petition that is associated with the at least one identified key term.

19. The content enhancement service subsystem of claim 14, wherein the action comprises sharing a message that is associated with the at least one identified key term on a social network.

20. The content enhancement service subsystem of claim 19, wherein the message is at least partially defined by the content enhancement service subsystem.

21. The content enhancement service subsystem of claim 14, wherein the content enhancement service subsystem is operative to track the number of times the issue action element is selected.

22. The content enhancement service subsystem of claim 14, wherein the content enhancement service subsystem is operative to track the number of times the issue interface is incorporated into any online presentation.

23. The content enhancement service subsystem of claim 14, wherein: the issue interface further comprises another issue action element that is associated with the at least one identified key term;

the incorporated issue interface enables selection of the other issue action element by the user using the content engager subsystem while the online presentation is presented to the user by the content engager subsystem;

selection of the other issue action element is operative to automatically carry out another action with another action target subsystem that is associated with the at least one identified key term while the online presentation is presented to the user by the content engager subsystem; and the action is different than the other action.

* * * * *